(12) United States Patent
Miyajima et al.

(10) Patent No.: US 7,231,902 B2
(45) Date of Patent: Jun. 19, 2007

(54) FUEL INJECTION VALVE AND INTERNAL COMBUSTION ENGINE MOUNTING THE SAME

(75) Inventors: Ayumu Miyajima, Chiyoda (JP); Yoshio Okamoto, Minori (JP); Yuzo Kadomukai, Ishioka (JP); Shigenori Togashi, Abiko (JP); Kiyoshi Amo, Chiyoda (JP); Makoto Yamakado, Tsuchiura (JP); Tohru Ishikawa, Kitaibaraki (JP); Hiromasa Kubo, Yokohama (JP); Hiroshi Fujii, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/134,415

(22) Filed: May 23, 2005

(65) Prior Publication Data

US 2005/0205051 A1   Sep. 22, 2005

Related U.S. Application Data

(60) Continuation of application No. 10/700,469, filed on Nov. 5, 2003, now abandoned, which is a continuation of application No. 10/214,312, filed on Aug. 8, 2002, now Pat. No. 6,675,766, which is a division of application No. 09/528,180, filed on Mar. 17, 2000, now Pat. No. 6,453,872.

(30) Foreign Application Priority Data

Mar. 17, 1999 (JP) .................................. 11-71412
Dec. 15, 1999 (JP) ................................ 11-355502

(51) Int. Cl.
*F02B 5/02* (2006.01)
*F02B 5/00* (2006.01)

(52) U.S. Cl. ..................................... 123/305; 123/295

(58) Field of Classification Search ................ 123/295, 123/298, 305, 306; 239/533.1, 533.2, 533.12, 239/463
See application file for complete search history.

(56) References Cited

U.S. PATENT DOCUMENTS

| 5,533,482 | A |   | 7/1996  | Naitoh |
| 5,577,473 | A |   | 11/1996 | Linder |
| 5,740,777 | A |   | 4/1998  | Yamamoto et al. |
| 5,915,353 | A | * | 6/1999  | Matsumura .................. 123/298 |
| 6,092,743 | A | * | 7/2000  | Shibata et al. ......... 239/533.12 |
| 6,095,113 | A |   | 8/2000  | Nogi et al. |
| 6,125,818 | A |   | 10/2000 | Okamoto et al. |

(Continued)

FOREIGN PATENT DOCUMENTS

DE          4405921          8/1995

(Continued)

*Primary Examiner*—Mahmoud Gimie
(74) *Attorney, Agent, or Firm*—Antonelli, Terry, Stout & Kraus, LLP.

(57) ABSTRACT

At an outlet portion of an injection hole (8) of a fuel injection valve (1), through removal of a part (A1, 7B) of a wall forming the injection hole (8), a restriction to a spray flow is released, thereby, a deflection spray is formed in which the spray is rich at the side of restriction released and is learn at the side of restricted, accordingly, ignition property of an internal combustion engine is improved, and an optimum spray is realized which reduces exhaust amount of unburnt gas components.

12 Claims, 14 Drawing Sheets

U.S. PATENT DOCUMENTS 6,334,427 B1 * 1/2002 Nakayama et al. ......... 123/305
6,453,872 B1 * 9/2002 Miyajima et al. ............ 123/298

FOREIGN PATENT DOCUMENTS

| | | |
|---|---|---|
| DE | 19812092 A1 | 9/1999 |
| EP | 0879944 A | 11/1998 |
| EP | 0918155 A | 5/1999 |
| JP | 05146886 | 5/1994 |
| JP | 6146886 | 5/1994 |
| JP | 09038767 | 3/1997 |

* cited by examiner

| SECTION | A - B | B - C |
|---|---|---|
| FUEL RELEASE PORTION (WITHIN PLANE PEPENDICULAR TO J AXIS) | NO | PISTON ⟵ ⌒ ⟶ PLUG<br>SEMICIRCLE (CONSTANT) |
| SPRAY INJECTION STATE (SPRAY SHAPE SEEN FROM N) | NO SPRAY | PISTON ⟵ ⟶ PLUG |

PISTON ←          PLUG →

FUEL INJECTION VALVE AND INTERNAL COMBUSTION ENGINE MOUNTING THE SAME

CROSS-REFERENCE TO RELATED APPLICATIONS

This application is a continuation of U.S. application Ser. No. 10/700,469, filed Nov. 5, 2003 now abandoned; which, in turn, is a continuation of application Ser. No. 10/214,312, filed Aug. 8, 2002 (now U.S. Pat. No. 6,675,766); which is a Divisional of parent application Ser. No. 09/528,180, filed Mar. 17, 2000 (now U.S. Pat. No. 6,453,872); the entire disclosures of which are hereby incorporated by reference.

BACKGROUND OF THE INVENTION

The present invention relates to a fuel injection valve which injects fuel into an internal combustion engine; and, more particularly, the invention relates to an improved fuel injection valve which provides an excellent fuel spray with regard to both the ignition property and the combustion property thereof.

As an alternative to an in-intake manifold fuel injection device, which injects fuel into an intake manifold of an internal combustion engine, an in-cylinder fuel injection device is known which injects fuel directly into a combustion chamber.

JP-A-6-146886(1994), for example, discloses such an in-cylinder type of gasoline injection engine. In this type of engine, by giving consideration to the position of the fuel injection valve and providing for formation of an intake flow of fuel having a vertical swirl (tumble flow) in the combustion chamber through an intake port extending upward from an intake opening, combustion can be performed stably with a leaner fuel mixture than that at the stoichiometric air fuel ratio, with the result that the fuel economy is improved.

However, the technology used in the above-described engine did not necessarily take into account fully the spray shape or the spray structure necessary to improve both the ignition property (firing property) and the combustion property (reduction of unburnt gas exhaust amount), as will be explained hereinbelow.

In order to optimize the spray injected from a fuel injection valve, it is necessary to take into account the following characteristics. First, there is the spray shape, which is influenced by the spreading angle of the spray and the distance the spray reaches. A second characteristic is the spray particle diameter, in that it is necessary to uniformalize the particle diameter distribution while reducing the number of particles having large diameters as much as possible. A third characteristic is the spray structure, which is required to optimize the space distribution of the sprayed fuel particles in the combustion chamber.

As a result of experimental analysis and study with regard to how these spray characteristics affect the combustion characteristics of an internal combustion engine, the following points need to be considered. In order to improve the ignition property, it is effective to increase the fuel particle distribution around an ignition unit and to enhance the distribution of the air fuel mixture of combustible density. On the other hand, if the fuel particle distribution in the direction of piston movement is reduced, unburnt gas components (HC, CO) in the fuel tend to decrease, so that the combustion property is improved. Further, in order to obtain a combustion stability over a broad range from a low engine rpm to a high engine rpm, it is preferable that the spray shape does not vary with a variation of pressure in the cylinder. This is because, since the geometric positional relationship between a fuel injector and an ignition unit is fixed, in order to always supply a fuel spray of a proper density to the ignition unit, it is important to keep the fuel spray expansion constant. In other words, a fuel spray injected by a conventional fuel injector tends to spread when pressure in a cylinder is low and tends to collapse, when the pressure in the cylinder is high. Therefore, if the arrangement of the fuel injector and the ignition unit is determined with reference to a comparatively high pressure condition of the cylinder, the fuel tends to deposit on an upper and side cylinder face in the cylinder or on the piston head, when the pressure in the cylinder lowers; on the other hand, if a comparatively low pressure condition in the cylinder is selected as a reference, it tends to be difficult for a fuel spray suitable for combustion to reach the ignition unit when pressure in the cylinder rises.

SUMMARY OF THE INVENTION

It is an object of the present invention to provide a fuel injection valve and an internal combustion engine mounting the same, which combination improves the ignition property of the internal combustion engine and provides a fuel spray which is suitable to reduce the amount of unburnt gas components exhausted at the time of the combustion.

In order to achieve the above object, a fuel spray is produced which has a shape that hardly varies with respect to a pressure variation in the cylinder. For this purpose, a fuel spray is generated in which the air fuel mixture converts toward the ignition unit and fuel particles which travel toward the comprise a lean mixture. For this purpose, air outside the spray is introduced into the spray from portions where the fuel particles form a lean mixture (or where fuel molecules are exhausted). Thereby, a pressure difference between the outside and the inside of the spray can be reduced, which makes it difficult for the spray to collapse.

Specifically, at an outlet port of an injection hole which is provided in the fuel injection valve for injecting fuel, by removing a part of the wall forming the injection hole, the restriction of the spray flow at that point is eliminated and a deflected spray is formed in which the spray component at the side of the injection hole where the restriction is removed is rich and the spray component at the restricted side of the injection hole is lean. In this instance, it is also preferable to vary the restriction force on the spray non-linearly.

In an internal combustion engine, it is preferable to arrange the fuel injection valve in such a manner that a rich spray is formed in the vicinity of the ignition unit and a lean spray is formed in the vicinity of the piston.

BRIEF DESCRIPTION OF THE DRAWINGS

FIGS. 2A and 2B are enlarged views of a nozzle member 7 of the solenoid type fuel injection valve 1 as shown in FIG. 1, wherein FIG. 2A is a vertical cross sectional view of the nozzle member 7 and FIG. 2B is a plane view of the nozzle member 7 in FIG. 2A as seen along arrowed direction N;

FIG. 6A is a photograph of a vertical cross section of a spray produced when the fuel injection valve according to the present invention injects fuel into the atmosphere, while

FIGS. 7A, 7B, 7C and 7D are enlarged views of nozzle members 7 representing other embodiments according to the present invention, wherein FIGS. 7A and 7C are vertical cross sectional views of the respective nozzle members 7, FIG. 7B is a plane view of the nozzle member 7 as shown in FIG. 7A and seen along the direction N of arrow, and FIG. 7D is a plane view of the nozzle member 7 as shown in FIG. 7C and seen along the direction of arrow N;

FIGS. 8A and 8B are enlarged views of a nozzle member 7 representing still another embodiment according to the present invention, wherein FIG. 8A is a vertical cross sectional view of the nozzle member 7 and FIG. 8B shows a plane view of the nozzle member 7 as shown in FIG. 8A and seen along the direction of arrow N;

FIGS. 9A, 9B and 9C show an embodiment of an internal combustion engine according to the present invention, wherein FIG. 9A is a vertical cross sectional view, FIG. 9B is a plan view of the combustion chamber as shown in FIG. 9A and seen along the direction of arrow P, and FIG. 9C is a schematic view of the piston head as shown in FIG. 9A and seen along the direction of arrow P;

FIGS. 10A and 10B show another embodiment of an internal combustion engine according to the present invention, wherein FIG. 10A is a vertical cross sectional view of the internal combustion engine, and FIG. 10B is a schematic view of the piston head thereof as seen along the direction of arrow P;

FIG. 12A and 12B show enlarged views of a nozzle member 7 representing a further embodiment of a fuel injection valve according to the present invention, wherein FIG. 12A is a vertical cross sectional view thereof and FIG. 12B is a plane view of FIG. 12A as seen along the direction of arrow N;

FIGS. 15A and 15B are enlarged views of a nozzle member 7 representing a further embodiment of a fuel injection valve according to the present invention, wherein FIG. 15A is a vertical cross sectional view thereof and FIG. 15B is a plane view of FIG. 15A as seen along the direction of arrow N.

DETAILED DESCRIPTION OF THE EMBODIMENTS

Figure 1:
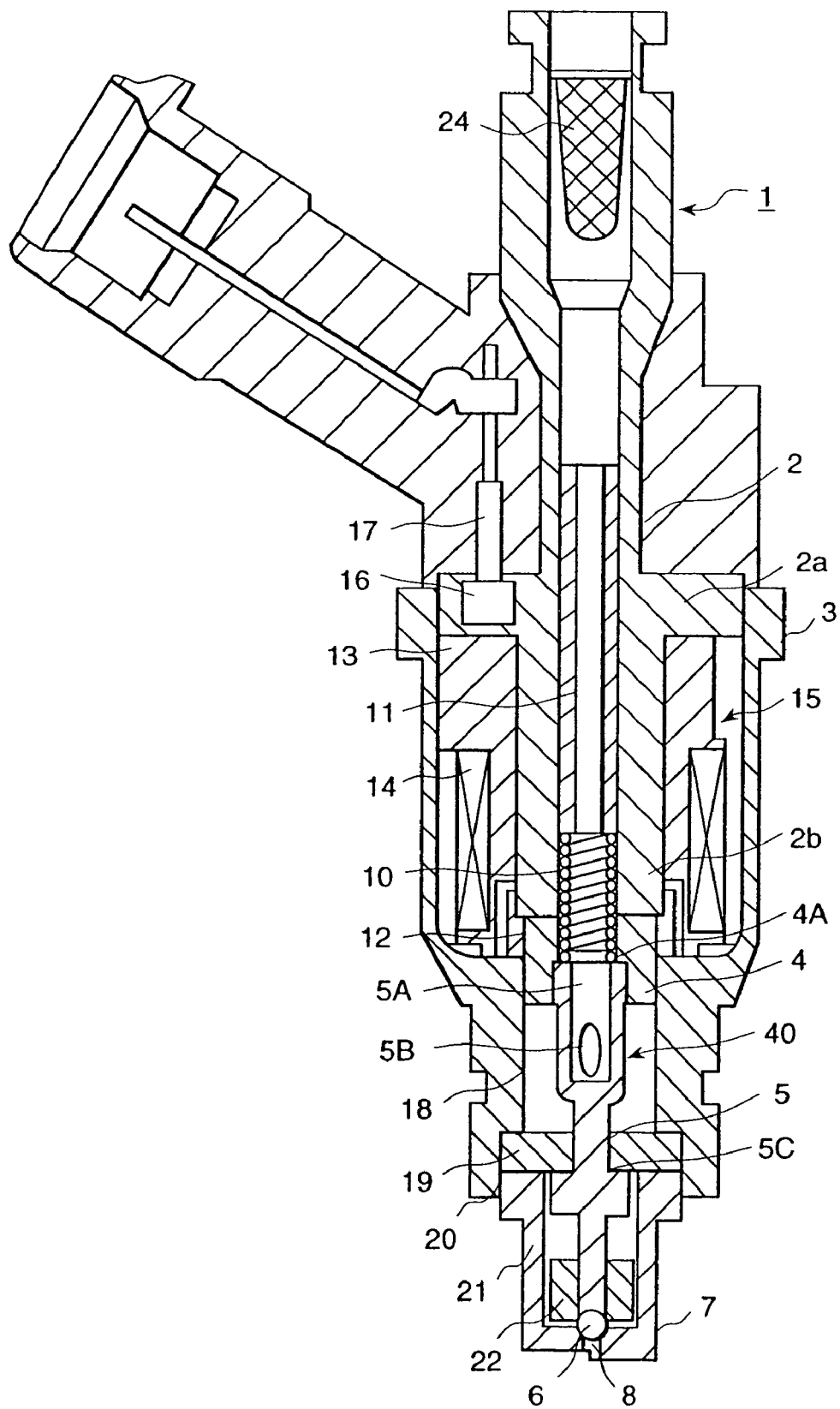
FIG. 1 is a vertical cross sectional view of a solenoid type fuel injection valve representing one embodiment of the present invention.

An embodiment of the present invention will be explained with reference to FIG. 1 through FIG. 6C. Hereinbelow, a plane which includes the valve axial center and is in parallel with the valve axial line is called the vertical cross sectional plane, and a plane perpendicular to the valve axial line is called a lateral cross sectional plane.

A solenoid type fuel injection valve 1 performs fuel injection through opening and closing of an opening in a seat portion thereof by ON-OFF duty signals calculated by a control unit. A magnetic circuit is formed by a yoke 3, a core 2 having a plug body portion 2a closing an open end of the yoke 3 and a column shaped portion 2b extending through a center portion of the yoke 3, and an anchor 4 facing the core 2 and spaced therefrom by a gap. At the center of the column shaped portion 2b, a hole 4A is provided for retaining a spring 10 functioning as an elastic member, through which a valve body 40, constituted by the anchor 4 made of a magnetic material, a rod 5 and a ball 6 joined to the rod 5, is pressed onto a seat face 9 in such a manner as to insert the ball 6 into an injection hole 8 in the seat face 9. The seat face 9 is formed in a nozzle member 7 together with the injection hole 8 so as to be disposed on the upstream side of the injection hole 8. The upper end of the spring 10 contacts the bottom end of a spring adjuster 11, which is inserted in the center of the core 2, so as to adjust the set load. At a gap between the side of column shaped portion 2b of the core 2 and the side of the valve body 40 of the yoke 3, a seal ring 12 is provided, which is mechanically fixed therebetween so as to prevent fuel from flowing out into the spaced occupied by the coil 14. The coil 14 which excites the magnetic circuit is wound around a bobbin 13, and the outer circumferential portion thereof is molded by a plastic material. A terminal 17 of a coil assembly 15 formed by the above elements is inserted into a hole 16 provided at the plug body portion (a flange) 2a of the core 2. The terminal 17 is coupled to a terminal of a control unit not shown.

At the yoke 3, a plunger receiving portion 18 is formed so as to receive the 20 valve body 40, and further a nozzle receiving portion 20 having a diameter which is larger than that of the plunger receiving portion 18 is provided as a through hole up to the top end of the yoke 3 for receiving a stopper 19 and the nozzle member 7. At the side of the anchor 4 of the rod 5, a hollow portion 5A which forms a fuel passage is provided. The hollow portion 5A is provided with a fuel flow outlet port 5B. The axial movement of the valve body 40 is guided through contact between the outer circumference of the anchor 4 and the inner circumference of the seal ring 12, and the ball 6 or the vicinity of the end at the side of the ball 6 secured to the rod 5 is also guided by an inner circumferential face 23 of a fuel swirl element 22. The fuel swirl element 22 is inserted in a center hollow portion formed in the nozzle member 7 and is positioned in contact with an inner wall 21 thereof at the upstream side of the seat face 9. In the present embodiment, the nozzle member 7 is constituted by a single piece member so as to include a cylindrical side wall portion (circumferential wall portion) 72 and an end face (bottom face) 71. In this instance, the nozzle member 7 constitutes a housing which accommodates the fuel swirl element 22 and a part of the valve body 40.

Further, the stroke (amount of movement upward along the axis in FIG. 1) of the valve body 40 is set by a gap between a receiving face 5C of a neck portion the rod 5 and the stopper 19. Still further, a filter 24 is provided for preventing invasion of dust and foreign matter in the fuel or in the pipe lines on the side of the valve seat between the ball 6 and the seat face 9.

Now, the nozzle member 7, having a structure including an L-shaped cut out face according to the present embodiment, will be explained with reference to FIG. 2.

The injection hole 8 is formed in such a manner that the center thereof coincides with the axial line (valve axial center) J of the valve body 40 and the wall face thereof is parallel to the axial line J. At a nozzle top end face 7A where an outlet opening of the injection hole 8 is formed; an L-shaped cut out portion is formed, which is constituted by a face 7B perpendicular to the axial line J and a face A1 substantially parallel to the axial line J. In this instance, the L-shaped cut out portion is configured as follows: the width of the injection hole 8 of the cut out portion is W, the length of the injection hole 8 at the most deeply cut out portion is L' and the length of the injection hole 8 of the portion not cut out (the least cut out portion) is L", and the top end face of the nozzle member 7 is constituted by the two plane faces 7A and 7B perpendicular to the axial line J and formed so as to sandwich the injection hole 8 and by a face A1 parallel to the axial line J and connecting these two plane faces 7A and 7B.

With the above structure, the outlet opening face of the injection hole 8 is formed so as to include a step on the plane faces 7A and 7B.

It is an objective of the above cut out portion to vary the restriction force applied to a fuel spray non-linearly with respect to the circumferential direction of the injection hole 8. It is a further objective to increase the non-linearity in the restriction force variation through a step shaped restriction force variation, in that with the above step portion, the restriction force variation is non-linearized. Therefore, the fuel injection valve according to the present embodiment is characterized as having the following structures:

(1) Two cross points, which are formed by a cross sectional plane including the center of the injection hole 8 and in parallel with the center axial line and by the periphery forming the outlet opening of the injection hole 8, are offset in the direction along the center axial line, and a step is formed at the periphery of the outlet opening on the way from one of the cross points to the other.

(2) In this case, two peripheries forming the outlet opening on the way from the respective two cross points to the corresponding step portions are aligned substantially in parallel when seen from a direction perpendicular to the above cross sectional plane.

(3) Further, the peripheries forming the outlet opening are formed so as to vary in the direction along the center axial line at the step portions.

(4) The outlet port face of the injection hole 8 is formed so as to include a step in the center axial direction of the injection hole 8.

(5) A step is provided at the outlet opening portion of the injection hole 8 so that the length of the passage wall forming the injection hole 8 varies non-linearly in the circumferential direction of the injection hole 8.

(6) At the outlet opening of the injection hole 8, a cutting substantially in parallel with the center axial line of the injection hole 8 is formed, and by removing a wall face of one side with respect to the cutting, the step is formed.

(7) Through the formation of a step at a nozzle top end face where the outlet opening of the injection hole 8 is formed, the step is formed at the outlet opening face.

(8) At the periphery forming the outlet opening for the injection hole 8, a step is formed in the center axial direction of the injection hole 8 so that the length of the passage wall face forming the injection hole 8 varies in the circumferential direction of the injection hole 8 and the fuel, which is provided at a pressure of 1.0–20 MPa at the fuel inlet portion, is injected from the fuel injection valve.

Figure 2A:
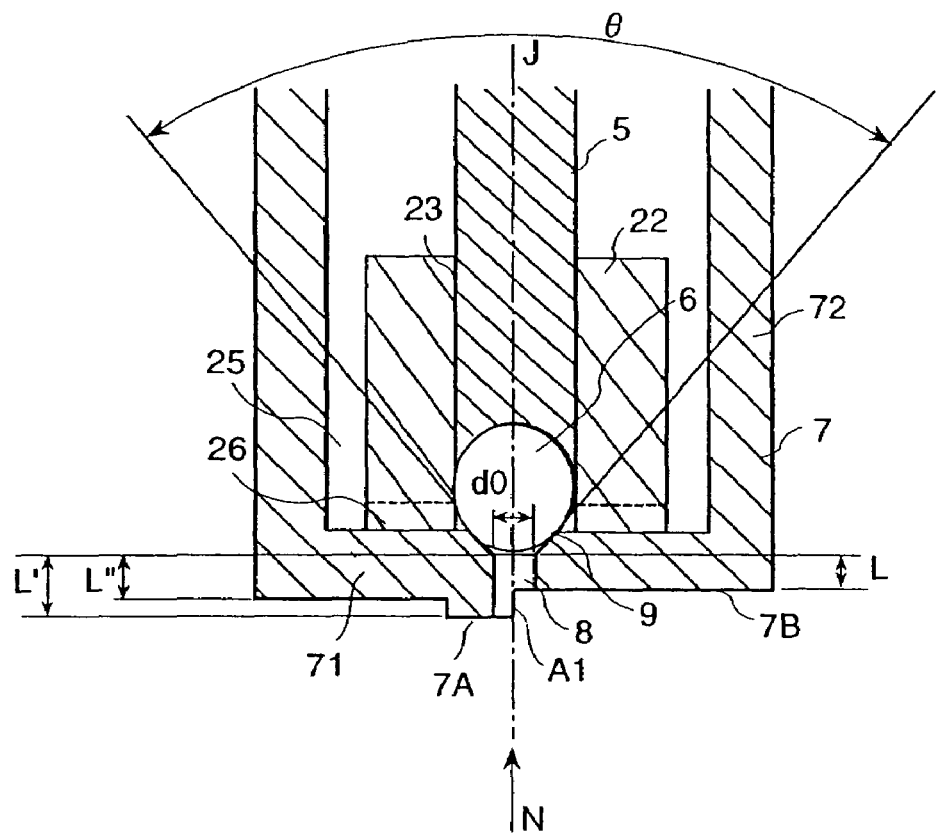

In the structure as shown in FIG. 2A, the spray formed therein has the following features.

(a) At the cut out side of the passage wall forming the injection hole 8, the distribution amount of the spray (distribution amount of the air fuel mixture) is increased.

(b) Since the kinetic energy of the spray injected from the cut out side is large, the particle diameters of the spray particles become small.

With regard to advantages (a) and (b) above, the firing property of the fuel is improved and the fuel economy is enhanced.

In the above structure the term "cut out", such as used in connection with the cut out face A1, never limits the processing method thereof, and simply implies a shape in which a part thereof is removed. Processing methods, such as a press working (plastic working) using a mold material and a casting can be used therefor. This is also true with respect to the embodiments described hereinafter. Further, the ball 6 does not necessarily have to have a spherical shape, namely the ball 6 can have a conical shape or a needle shape.

Figure 2B:
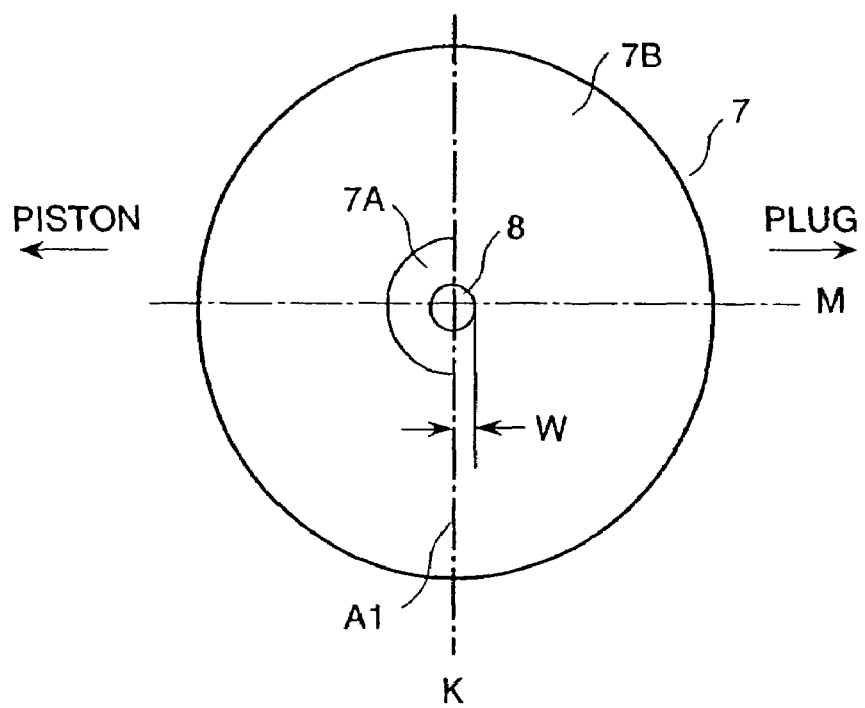

FIG. 2B identifies a diameter do of the injection hole 8, a seat angle θ, an arrow "PLUG", an arrow "PISTON" and lines K and M. The line K represents a line which passes through the center of the injection hole 8 and is in parallel with the cut out face A1, the line M represents a line which passes through the center of the injection hole 8 and is perpendicular to the line K, and the arrow "PLUG" and the arrow "PISTON" are in parallel with the line M.

Further, in FIG. 2A, the fuel swirl element 22 is provided with axial direction grooves 25 formed in a plane of the outer circumferential portion of the fuel swirl element 22 and with radial direction grooves 26. In the present embodiment, although the axial direction grooves 25 are formed in a plane, however, other shapes such as an annular passage can be used. The axial direction grooves 25 and the radial direction grooves 26 form passages for fuel introduced upward from the fuel swirl element 22, however, the fuel which has passed through the axial direction grooves 25 is introduced while being deflected from the axial center by the radial direction grooves 26 and is provided with a swirl which functions to promote atomization of the fuel when the same is injected by the injection hole 8 provided at the nozzle member 7. Herein, the swirl strength (a swirl number S) provided by the fuel swirl element 22 is determined by the following equation.

$$S = \text{(angular momentum)}/\text{(momentum in injection axis direction)} \times \text{(injection hole radius)} = (2 \cdot d_0 \cdot Ls)/(n \cdot d_s 2 \cdot \cos(\theta/2))$$

Herein, $d_0$: diameter of injection hole $L_S$: deflection amount of groove (distance between valve axial center and groove (width) center)

n: number of grooves

θ: angle of valve seat $d_S$: flow dynamics equivalent diameter represented by groove width and groove height = $2 \cdot W \cdot H / W + H$ When the swirl number S is increased, the atomization is promoted and the spray is dispersed.

An example of the operation of the fuel injection valve 1 of the present embodiment will be explained hereinbelow. When an electric signal is applied to the coil 14, a magnetic circuit is formed through the core 2, yoke 3 and the anchor 4, and the anchor 4 is attracted to the core 2. When the anchor 4 moves, the ball 6 rises from the seat face 9 and the fuel passage is opened.

The fuel flows inside the fuel injection valve 1 from the filter 24, and through an inner passage of the core 2, an outer circumferential portion of the anchor 4, the hollow portion 5A which is provided inside the anchor 4 to permit fuel to pass and the fuel flow out port 5B, whereby the fuel runs downstream. Then, the fuel is supplied to the seat portion while swirling through a gap between the stopper 19 and the rod 5, and passes through the axial direction fuel passages 25 and the radial direction fuel passages 26.

Now, the spray structure of the fuel injection valve 1 according to the present embodiment will be explained with reference to FIG. 3A through FIG. 6C.

Figure 5A:
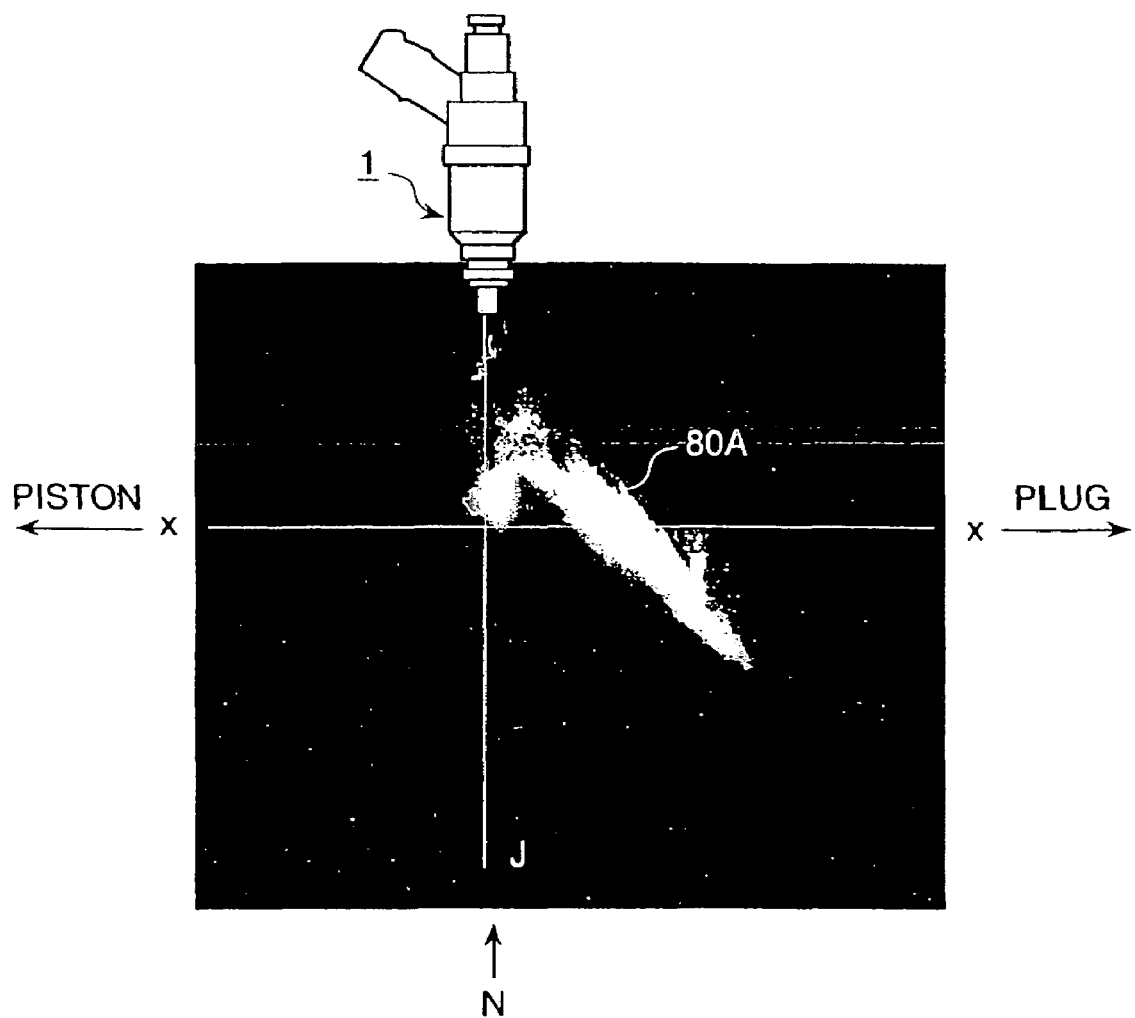
FIG. 5A is a photograph of a vertical cross section of a spray, produced when the fuel injection valve according to the present invention injects fuel into the atmosphere.
Figure 5B:
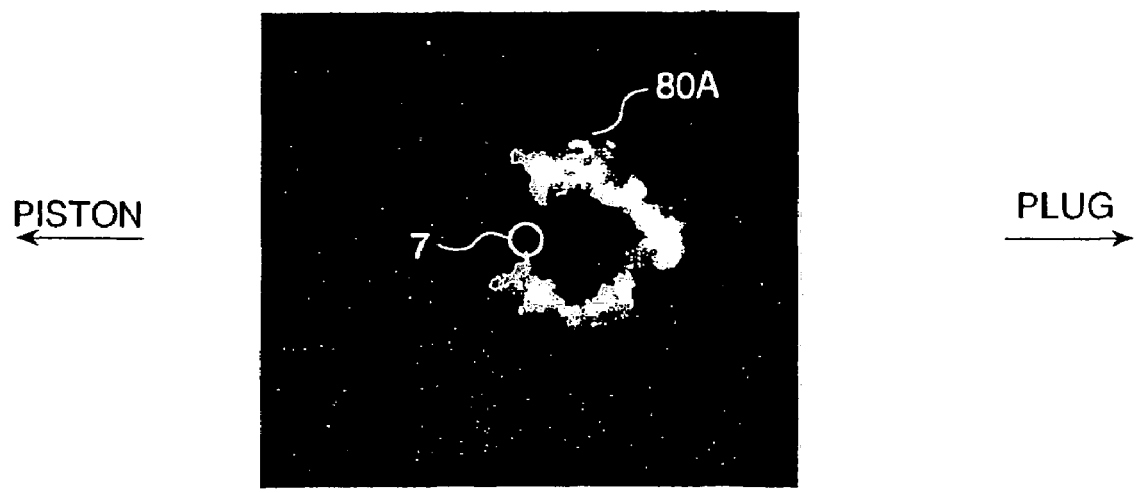
FIG. 5B is a photograph of a laterally cross sectioned view of the spray taken along the sectional plane X—X, as seen in the direction of arrow N in FIG. 5A.

FIGS. 5A and 5B are photographs showing an example of an experimental result in which a spray injected by the fuel injection valve 1 according to the present embodiment. In this experiment, the fuel pressure was about 7 MPa under an atmospheric condition. For photographing the spray in vertical cross section, laser beams are irradiated to the spray while setting the laser sheet beams so as to form a plane including the valve body axial line J, and an image of a spray at 2–3 ms after the fuel injection was photographed by a camera. Similarly, for photographing the spray in lateral cross section, the photographing was performed while setting the laser sheet beams so as to form a X—X plane perpendicular to the valve body axial line J. As shown in the drawings, the vertical and lateral cross sections of the spray injected from the fuel injection valve 1 according to the embodiment are deflected in the direction of arrow "PLUG", and the air fuel mixture of combustible density is rich at the deflection side, on the other hand, in the direction of arrow "PISTON", the spray assumes the distribution as shown by the region 80A where the air fuel mixture of combustible density is lean.

Figure 6A:
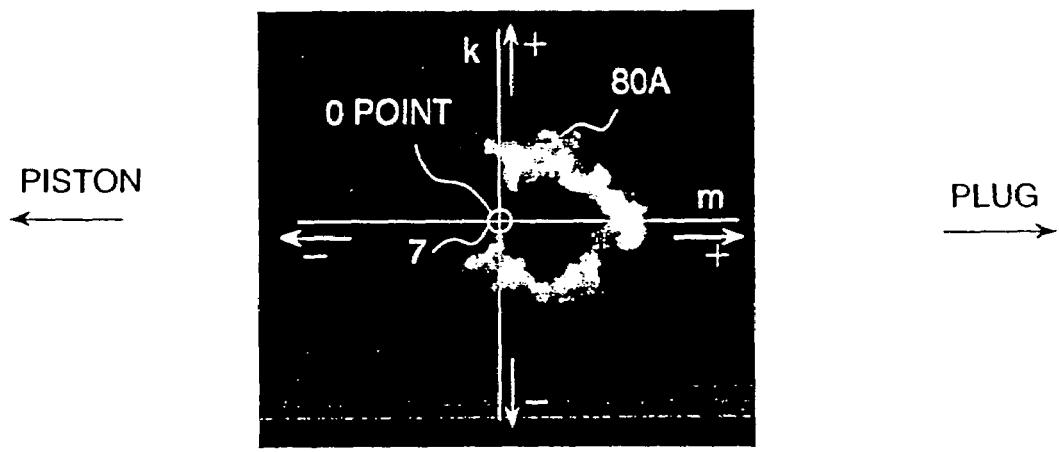
Figure 6B:
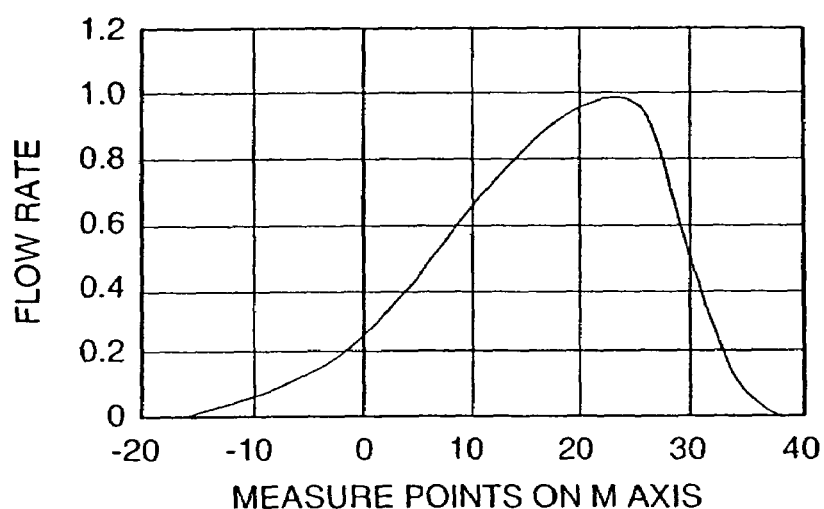
FIGS. 6B and 6C are graphs showing flow rate distributions along the axis lines defined in FIG. 6A.
Figure 6C:
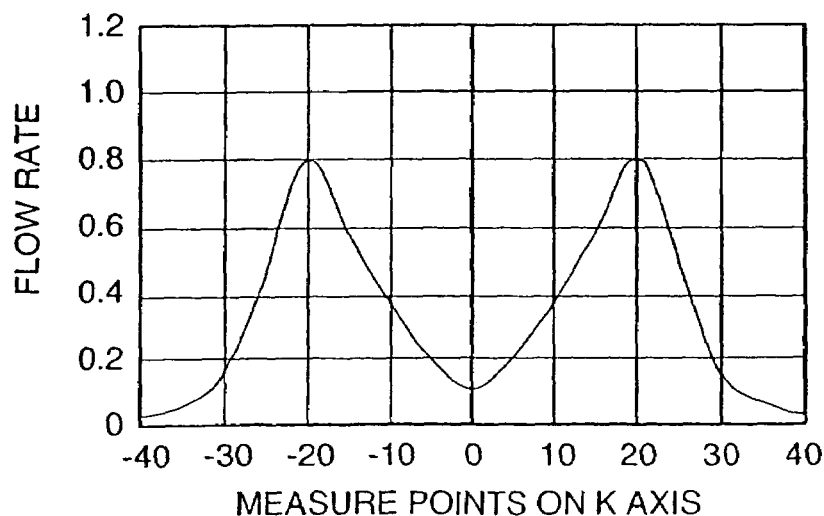

FIGS. 6A, 6B and 6C are diagrams showing an example of flow rate distribution of a spray injected by the fuel injection valve 1 according to the present embodiment. FIG. 6A shows an example of a spray cross section of which the flow rate distribution was measured. FIG. 6B shows a flow rate distribution on line m defined in FIG. 6A, and FIG. 6C shows a flow rate distribution on line k defined in FIG. 6A. The experimental condition was the same as that in FIGS. 5A and 5B. The abscissas in FIGS. 6A and 6B represent measurement points respectively on lines m and k, and the ordinates thereof have no dimension while assuming the maximum flow rate as 1. As shown in FIG. 6B, the spray is largely distributed on the "PLUG" side and is distributed less on the "PISTON" side. Further, as shown in FIG. 6C, the distribution on line k is substantially symmetric.

Figure 3A:
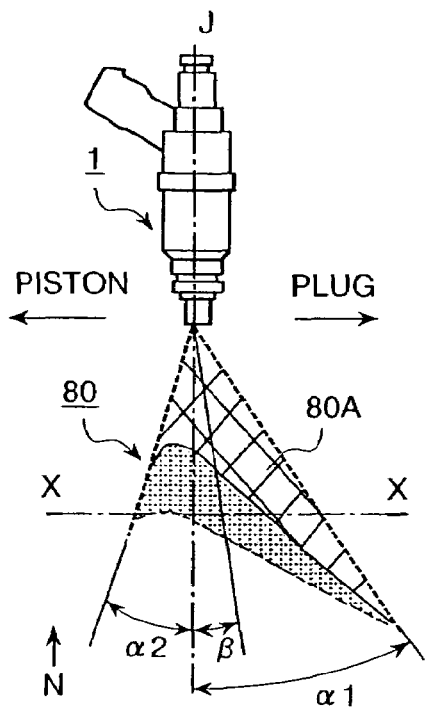
FIG. 3A is a diagram showing a spray produced when a fuel injection valve according to the present invention injects fuel.

As shown in FIG. 3A, the spray injected from the fuel injection valve 1 according to the present embodiment is deflected by a deflection angle β toward the direction of arrow "PLUG", and at the deflection side the air fuel mixture of combustible density is rich, while at the "PISTON" side, the air fuel mixture of combustible density is lean. The relationship between a spray angle α1 at the side "PLUG" side and a spray angle α2 at the "PISTON" side with respect to the center axial line of the injection hole 8 is α1>α2, thereby, the distribution as shown by a region 80 results. Further, the distance through which the fuel spray is injected in the direction of arrow "PLUG", namely to the side where the outlet of the injection hole 8 is cut out, is longer than the distance through which the fuel spray is injected to the side where the outlet of the injection hole 8 is not cut out. Herein, a vertical cross section of the spray in a plane containing the valve axial line J and in parallel with J shows a region 80A indicated by net shaped hatchings. Herein, the deflection angle β is determined by the following equation.

$$\beta = (\alpha 1 - \alpha 2)/2$$

Figure 3C:
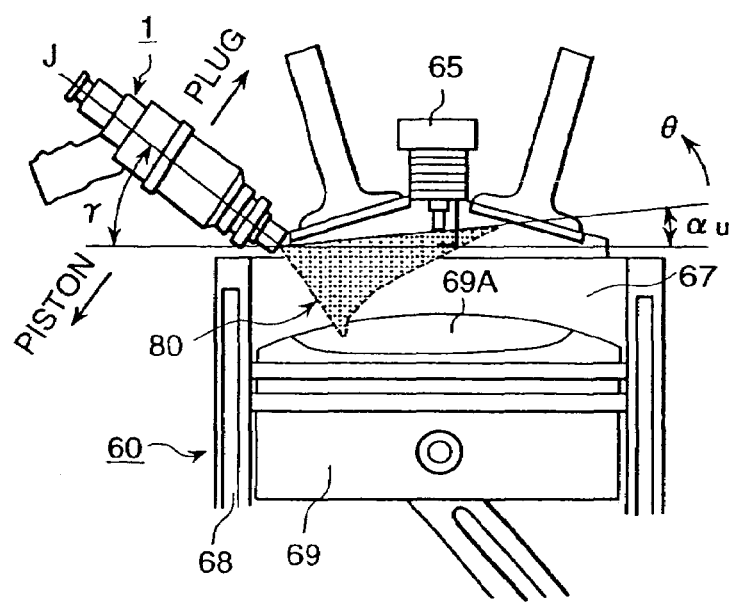
FIG. 3C is a schematic diagram of the cylinder of an internal combustion engine in which the fuel injection valve of the present invention is mounted, wherein fuel is directly injected into the combustion chamber (cylinder)
Figure 3B:
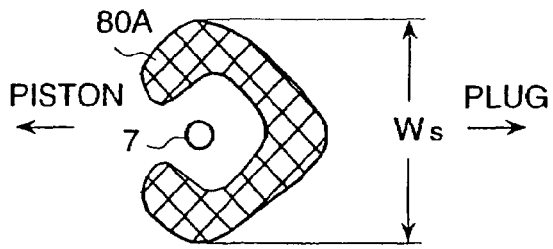
FIG. 3B is a lateral cross sectional view of the spray taken along a cross sectional plane X—X in FIG. 3A, as seen in the direction of an arrow N.

Further, as shown in FIG. 3B, with respect to the spray pattern in the X—X lateral cross section as seen from direction of arrow N, the air fuel mixture of combustible density is rich at the "PLUG" side and is lean at the "PISTON" side, and, in an extreme case, a condition occurs in which no fuel particles exist. Namely, as shown by the region 80A, a distribution where a part of the spray is cut at the side of arrow "PISTON" is observed. Further, when the fuel injection valve 1 according to the present embodiment is attached at an angle γ to the internal combustion engine 60 while retaining the arrow directions "PLUG" and "PISTON" as shown in FIG. 3C, the air fuel mixture converges around the ignition unit 65 provided in the internal combustion engine 60. On the other hand, the air fuel mixture formed around a cavity 69A on the piston 69 disposed in the cylinder 68 becomes lean, and a distribution as shown by the region 80 having a spray upper end angle αu is formed. Namely, the spray angle is large in the direction of the ignition unit 65 and is small in the direction of the cavity 69A of the piston 69. Further, the density of the combustible air fuel mixture is rich at the side of the ignition unit 65 and is lean at the side of the cavity 69A of the piston 69, and still further, the distance the spray reaches is long in the direction of the ignition unit 65 and is short in the direction of the cavity 69A of the piston 69. Herein, the spray upper end angle αu is defined while assuming the direction of arrow θ as positive. In FIG. 3C, it is assumed that in the combustion chamber 67 there is no gas flow other than the spray and the pressure in the cylinder 68 is substantially equal to atmospheric pressure.

Figures 4A, 4B:
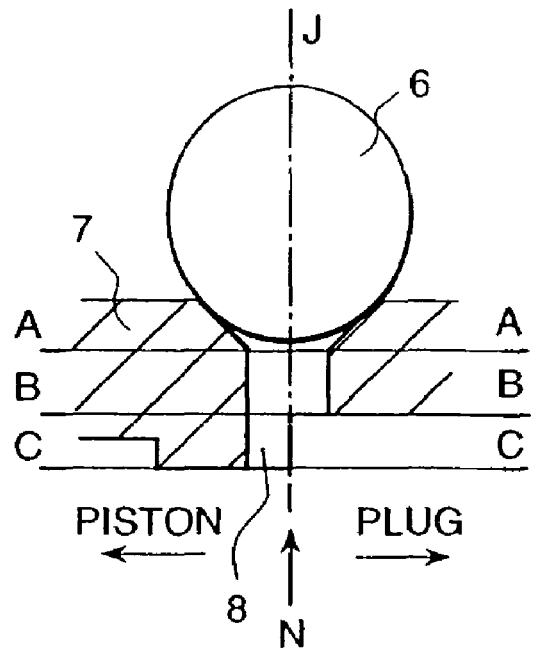
FIG. 4A is an enlarged view of an injection hole portion of the fuel injection valve according to the present invention.
FIG. 4B is a diagram showing the shape of a fuel released portion and a spray cross sectional configuration.

A comparison with regard to the fuel release portion and spray injecting condition will be explained at a section (section A-B) which extends from a cross section A—A to a cross section B—B and at another section (section B-C) which extends from the cross section B—B to a cross section C—C as shown in FIGS. 4A and 4B. At the section A-B, since the fuel is restricted by the entire circumference of the injection hole 8, no spray is injected. On the other hand, at the section B-C, the fuel is released in a semicircular shape, as shown in FIG. 4B. Therefore, the spray is injected to the "PLUG" side, but is not injected to the "PISTON" side, thereby, the cross sectional shape of the spray assumes a horseshoe shape where a part of the spray is cut as illustrated. Accordingly, if the pressure in the combustion chamber varies due to movement of the piston 69, the pressures inside and outside the spray likely balances, and the spray is hardly collapsed and the configuration thereof is maintained constant.

In the present embodiment, although the step (L'–L) is to be determined in view of the inner diameter of the cylinder, namely, the volume of the engine and the attachment angle of the fuel injection valve, the step is set at least to more than 0. Further, in order to obtain a substantial variation of the spray structure (an expanding angle, a reaching distance and a spatial distribution) it is preferable to set the step (L'–L) in the following range $0 < (L'-L)/d_0 \leq 1$, for an internal combustion engine having an ordinary engine volume of 2–3 liter and an ordinary fuel injection valve attachment angle of 10°–50°.

In the present embodiment, although the projecting portion 7A is formed at the outlet portion of the injection hole 8 on the top end face of the nozzle member 7, the projecting portion 7A need not necessarily be provided. In a structure without the projecting portion 7A, the length of the injection hole 8 where no cut out (or portion having the least cut out) is provided assumes the value L". In this case, the relationship with regard to the length of the injection hole 8 is given as L'>L">L.

However, through the provision of the projecting portion 7A, a large step (L'–L) can be constituted only with a weight increase associated with the projecting portion 7A, and a further large spray angle α1 (as defined in FIG. 3A) can be realized.

Further, through an adjustment of the injection hole width W, the spray cross section Ws (as defined in FIG. 3B) can be adjusted, in that, by decreasing W, Ws can be decreased and by increasing W, Ws can be increased, thereby, W can be set in a range $O < W \leq d_0$.

As has been explained above, by adjusting the size of the step (L'–L), the deflection amount of the spray (the angle α1 or β as shown in FIG. 3A) can be adjusted. Further, by adjusting the range (the range for shortening the passage wall) of removal of the passage wall of the injection hole 8 with respect to the circumferential direction thereof the expansion Ws of the lateral cross section of the spray can be adjusted.

The nozzle member 7 can be constituted as shown in FIGS. 7A through 7D.

Figure 7A:
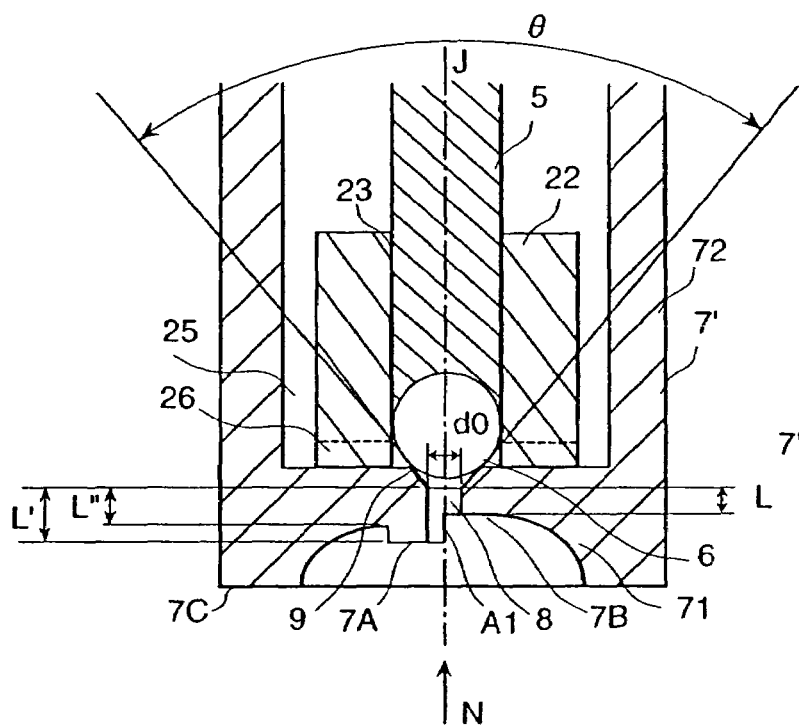
Figure 7C:
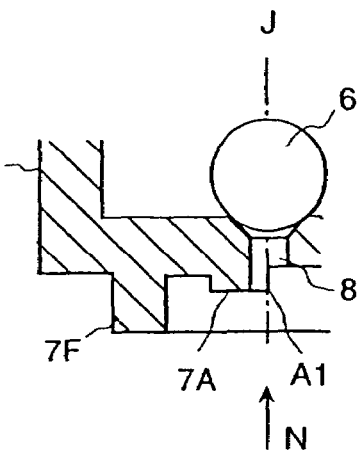
Figure 7B:
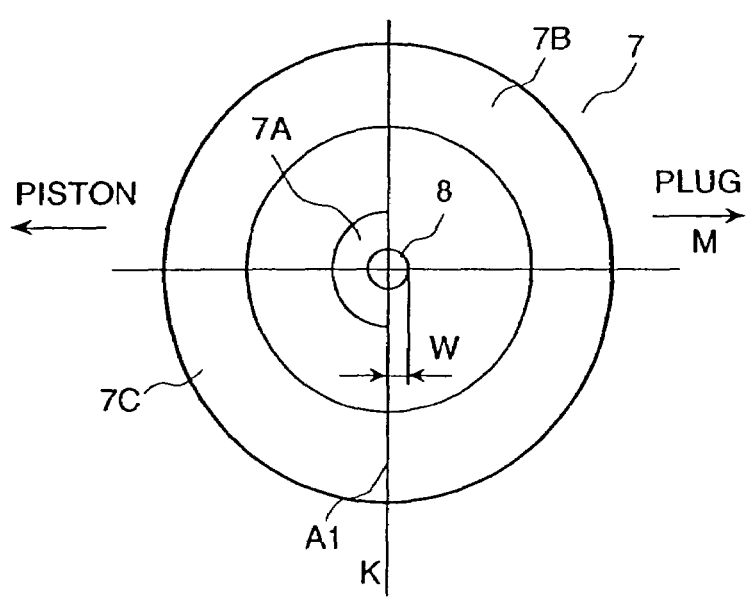

In the nozzle member 7' as shown in FIGS. 7A and 7B, a thick portion 7C is provided around the circumferential portion of the bottom face portion (end face portion) 71 of the nozzle member 7'. Namely, in this case, by means of the thick portion 7C, vibration noises caused when the ball 6 seats on the seat face 9 can be reduced.

Figure 7D:
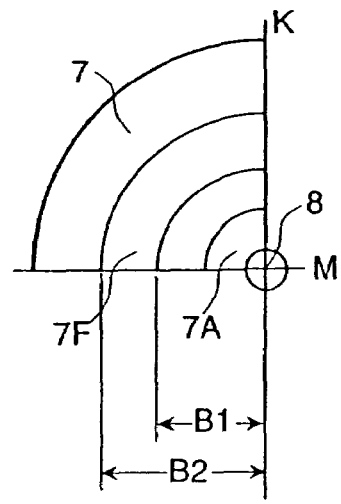

Further, as shown in FIGS. 7C and 7D, through provision of a substantially annular thick portion 7F having thickness of (B2–B1) formed at a distance B1 from the center of the injection hole 8, the vibration noise can be reduced.

Figure 8A:
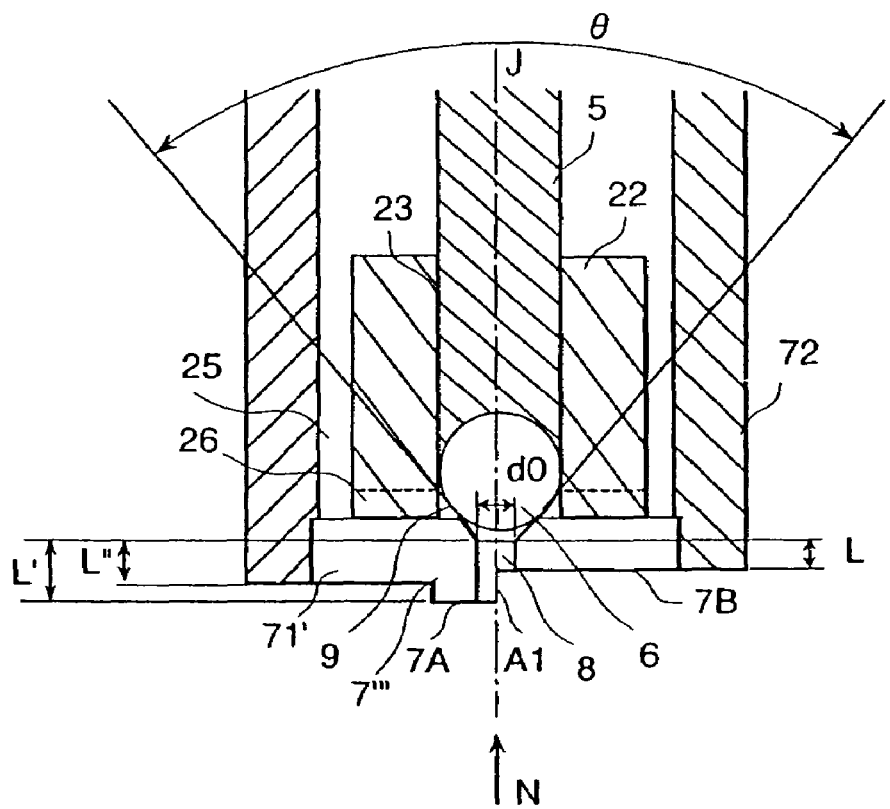
Figure 8B:
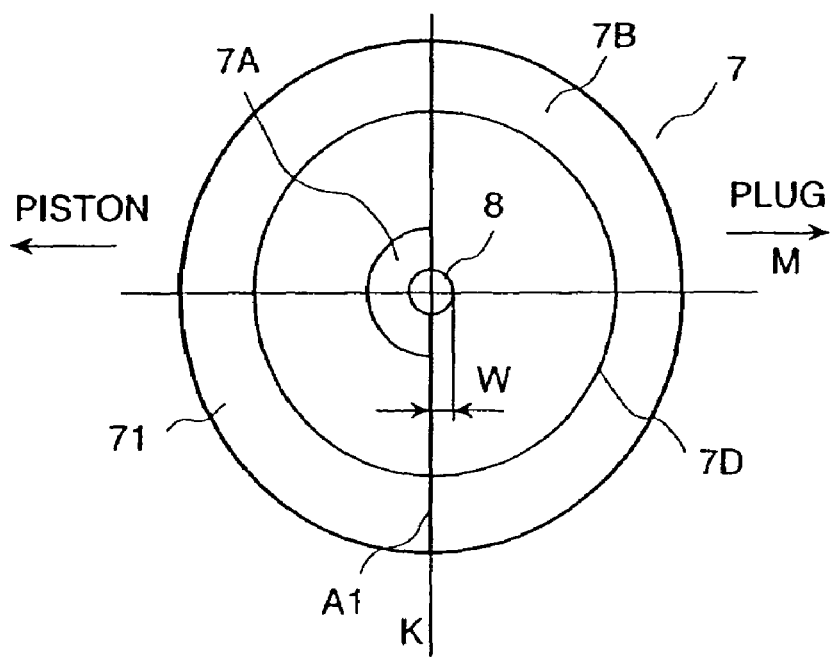

Further, the nozzle member 7 can be constituted as shown in FIGS. 8A and 8B.

A nozzle member 7''' is constituted only by a bottom face portion 71' of a housing which accommodates the fuel swirl element 22 and a part of the valve body 40, and is constituted by a separate body from a side wall portion 72'. The side wall portion 72' constitutes a nozzle guide body for guiding the nozzle member 7'''. The nozzle member 7''' is welded along a joint portion 7D to the side wall portion (nozzle guide body) 72'. Namely, in the present structure, a portion which is to be properly varied depending on an engine volume and an attachment angle of an injection valve is concentrated only at the bottom face portion 71' of the housing, thereby, the productivity thereof is improved.

Figure 9A:
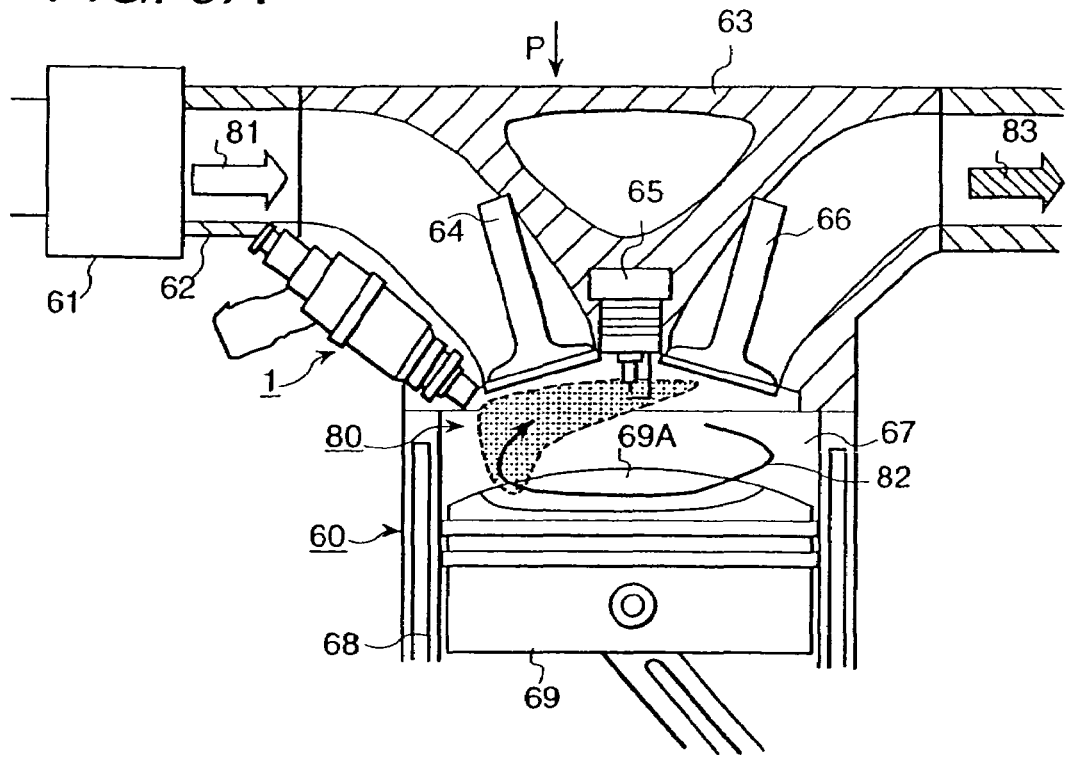
Figure 9B:
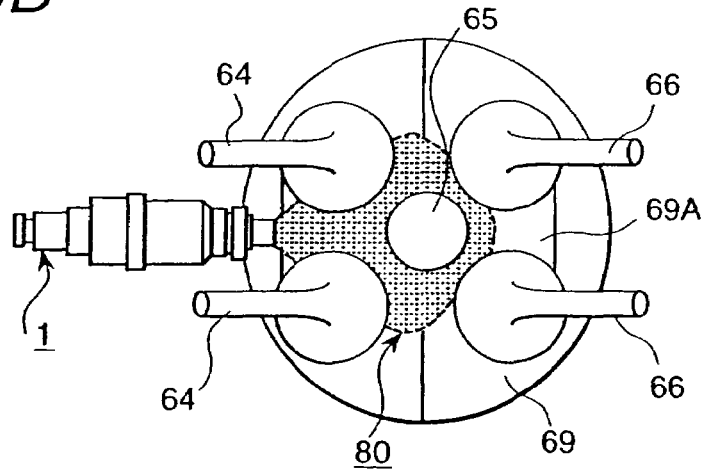
Figure 9C:
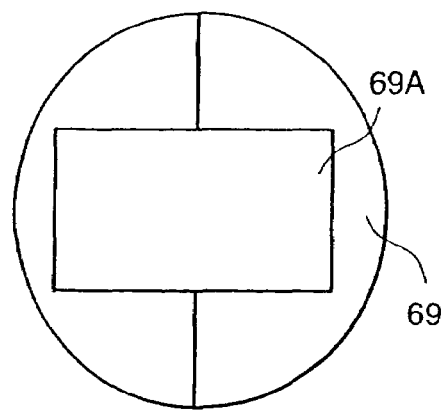

An embodiment of an internal combustion engine will be explained with reference to FIGS. 9A through 9c.

The piston 69 disposed in the cylinder 68 moves up and down in the cylinder 68 in response to rotation of a clank shaft not shown. On the upper portion of the cylinder 68, a cylinder head 63 is mounted to form a closed chamber together with the piston and the cylinder 68. In the cylinder head 63, there are an intake manifold 62, which introduces external air into the cylinder 68 via an intake air flow rate control unit 61 incorporating a throttle valve, and an exhaust manifold, which carries combustion gas burnt in the cylinder 68 into an exhaust unit.

At the side of the intake manifold 62 of the cylinder head 63, intake valves 64 are provided, while at the center thereof the ignition unit 65 is provided and at the opposite side of the intake valves 64 exhaust valves 66 are respectively provided. The intake valves 64 and the exhaust valves 66 are disposed in such a manner to extend into the combustion chamber 67. Herein, the fuel injection valve 1 is attached near a connecting portion of the intake manifold 62 in the cylinder head 63, and the axial line of the fuel injection valve 1 is set to be directed slightly downward in the combustion chamber 67 (in such a manner that the same is directed slightly away from the location of the ignition unit 65). The attachment angle γ thereof is usually about 10°–50°.

Numeral 69 identifies the piston, and numeral 69A denotes a cavity (a recess) provided on the piston 69. The cavity 69A is provided in the radial direction of the piston 69 over a range from the side of the exhaust valves 66 beyond the position of the ignition unit 65 to the side of the intake valves 64 (almost the position of the injection hole 8). The injection hole 8 is directed toward the cavity 69A provided on the piston 69. A blanked arrow 81 in the drawings shows the flow of intake air and a hatched arrow 83 shows the flow of exhaust gas.

The fuel for the internal combustion engine 60 is pressurized by a pump and supplied to the fuel injection valve 1 and is directly injected into the combustion chamber 67 by the fuel injection valve 1 in synchronism with the timing of the intake air, and immediately before the firing thereof, is distributed as shown by the region 80. A mixing of the fuel atomized by the injection with the air flow (tumble flow) 82 introduced via the intake air manifold 62 is promoted in the combustion chamber 67.

The tumble flow 82 passes through the side of the cylinder head 63 to the side of the exhaust valves 66, changes in flow direction below the exhaust valves 66 toward the piston 69, and is introduced to the vicinity of the fuel injection valve 1 along the curved face of the cavity 69A so as to carry the spray upward. The spray deflected toward the ignition unit 65 is further directed toward the ignition unit 65 by the tumble flow 82. On the other hand, the spray directed toward the cavity 69A is lean, thereby, an excess fuel spray toward the piston 69 is prevented. Accordingly, the deposition of the fuel spray on the piston 69 can be reduced. Thereafter, the air fuel mixture is compressed during a compression stroke and is fired stably by the ignition unit 65, thereby, a stable combustion is realized which suppresses the amount of unburnt gas. By cutting off a part of the spray, a pressure difference between the inside and the outside of the spray is eliminated, thereby, the spray configuration hardly changes in response to a pressure variation inside the cylinder 68, with the result that, a spray can be provided which shows a desirable combustion stability in a broad range of engine rpm.

In an in-cylinder gasoline injection engine, a tumble flow is generated in the combustion chamber, therefore, the combustion of a lean air fuel mixture can be realized without significantly modifying the cylinder head configuration of a conventional engine.

According to the fuel injection valves of the above respective embodiments, at an outlet port of the injection hole, by removing a part of the wall face forming the injection hole, a restriction of the spray flow is released and a deflecting spray is formed in which the air fuel mixture of combustible density at the side where the restriction is released is rich and that at the restricted side, the air fuel mixture of combustible density is lean. For this reason, the flow of spray is hardly disturbed, as will occur in a case where a part of the injection hole is shielded. The above feature is particularly advantageous when the fuel injection valve injects fuel while applying a swirling force thereto, because the applied swirl energy is hardly dissipated.

Further, the fuel injection valves according to the respective embodiments can be realized by cutting out a part of the wall forming the injection hole at the outlet port thereof, by providing a step at the outlet opening portion of the injection valve so that the length of the injection hole varies in the circumferential direction thereof or by forming a recess at the nozzle top end face including a part of the wall face forming the injection hole. When looking at these embodiments from another point of view, a part of the wall face forming the injection hole is provided by extending it toward the down stream side (at the top end side of the nozzle body) in comparison with the other portion thereof Another embodiment of an internal combustion engine according to the present invention will be explained with reference to FIGS. 10A and 10B.

Figure 10A:
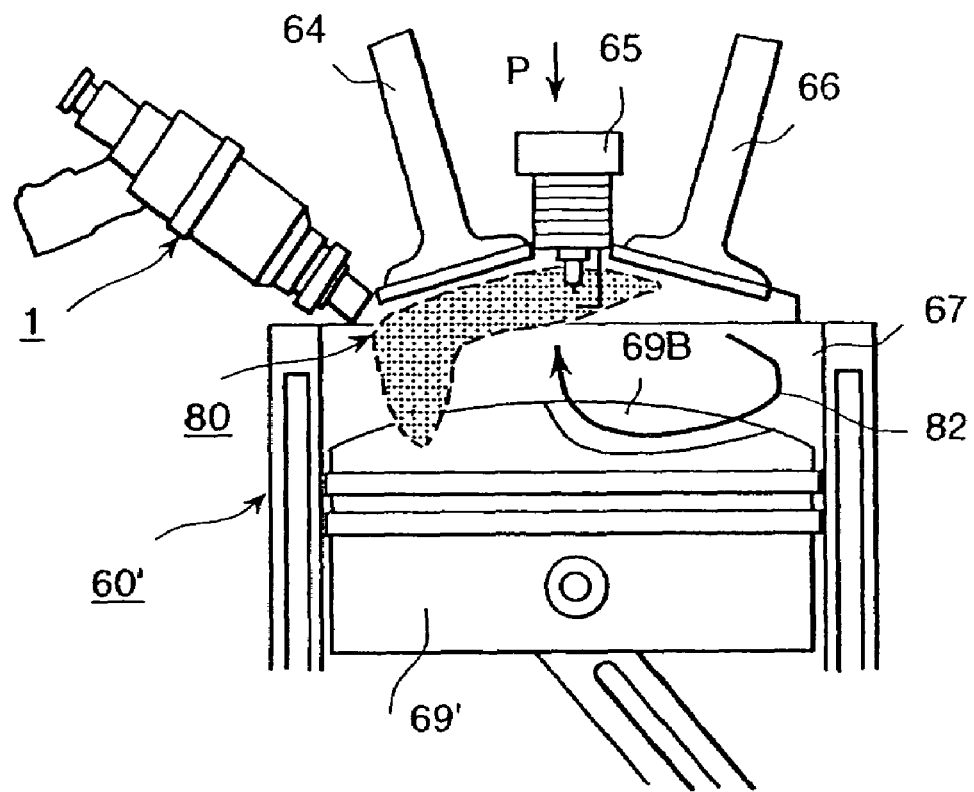

In an internal combustion engine 60' as shown in FIG. 10A, a cavity 69B is provided so that the tumble flow 82 rises up from a position immediately below the ignition unit 65. The cavity 69B is formed on the piston 69' in the radial direction thereof over a range from the side of the exhaust valves 66 rather the position (center portion of the cylinder 68) of the ignition unit 65 to nearly the position of the ignition unit 65. The tumble flow 82 flows along the cylinder head to the exhaust valves 66, changes its flow direction below the exhaust valves 66 to the piston side, then flows along the curved face of the cavity 69A, and induces a flow directed toward the ignition unit 65 in such a manner as to carry the spray upward at the position immediately below the ignition unit 65. Through the tumble flow 82 induced by the cavity 69B, a converging property of the air fuel mixture 80 of combustible density toward the ignition unit 65 can be enhanced.

Figure 10B:
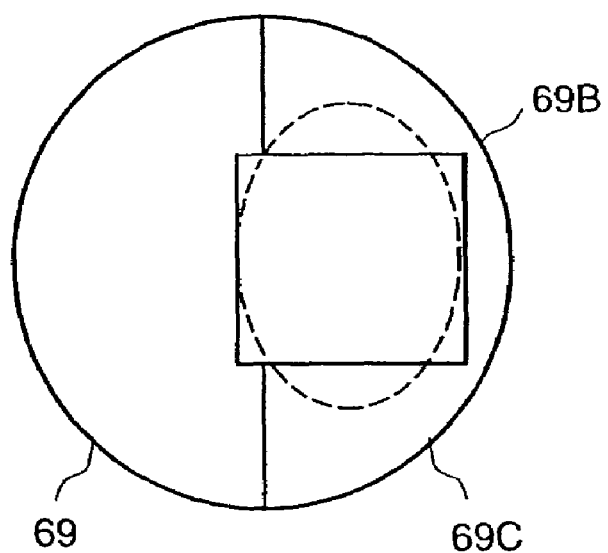

The configuration of the cavity can almost be an oval shape as shown by a dotted line 69C in FIG. 10B.

Still another embodiment of an internal combustion engine according to the present invention will be explained with reference to FIG. 11.

Figure 11:
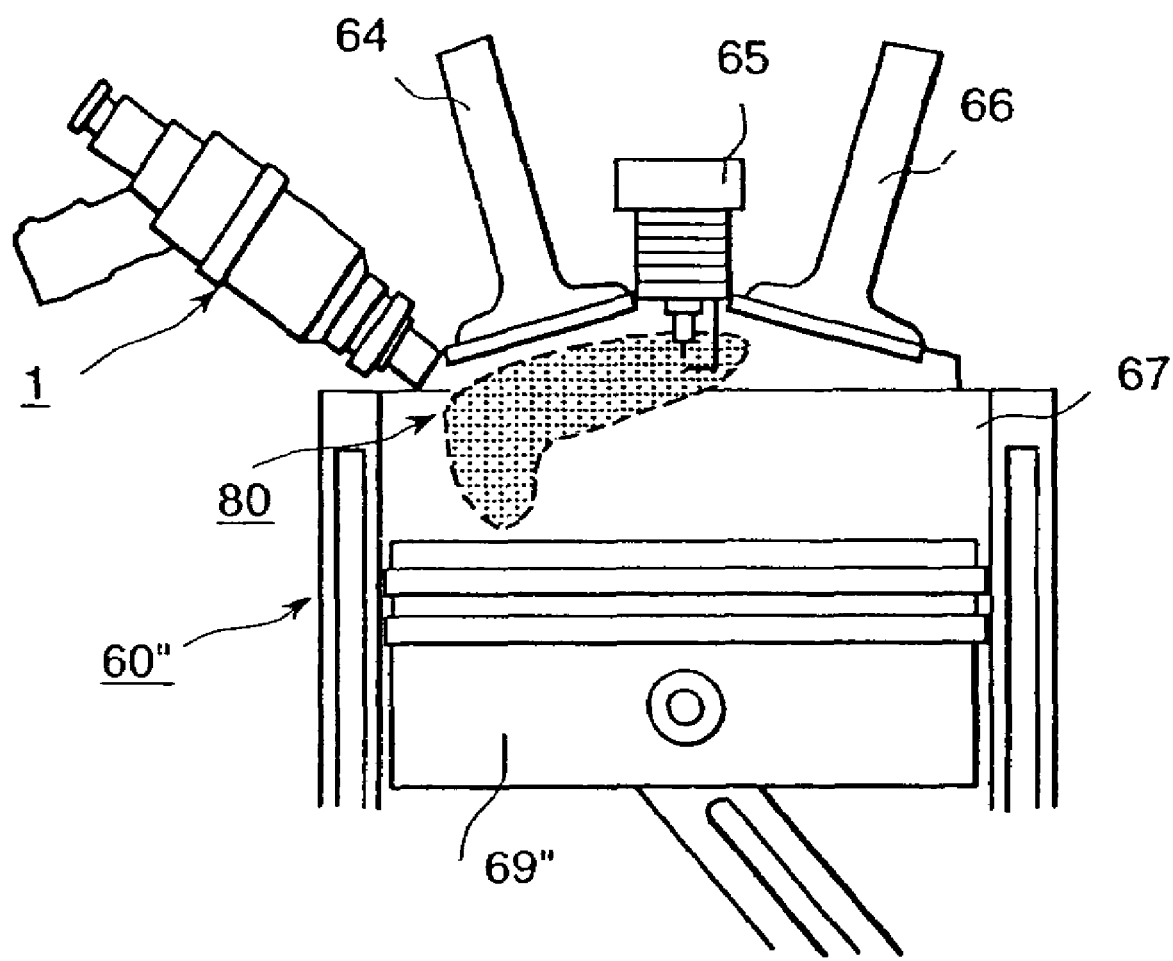
FIG. 11 is a vertical cross sectional view showing still another embodiment of an internal combustion engine according to the present embodiment.

In an internal combustion engine 60" as shown in FIG. 11, a flat piston 69 with no cavity is provided. By setting proper spray angles α1, α2, β and αu and spray expansion Ws by adjusting L, L', L", $d_0$ and W as has been explained in connection with FIG. 2A through FIG. 3C, the air fuel mixture 80 of combustible density can reach the ignition unit 65 without using a tumble flow or with a comparatively weak tumble flow.

Figure 12A:
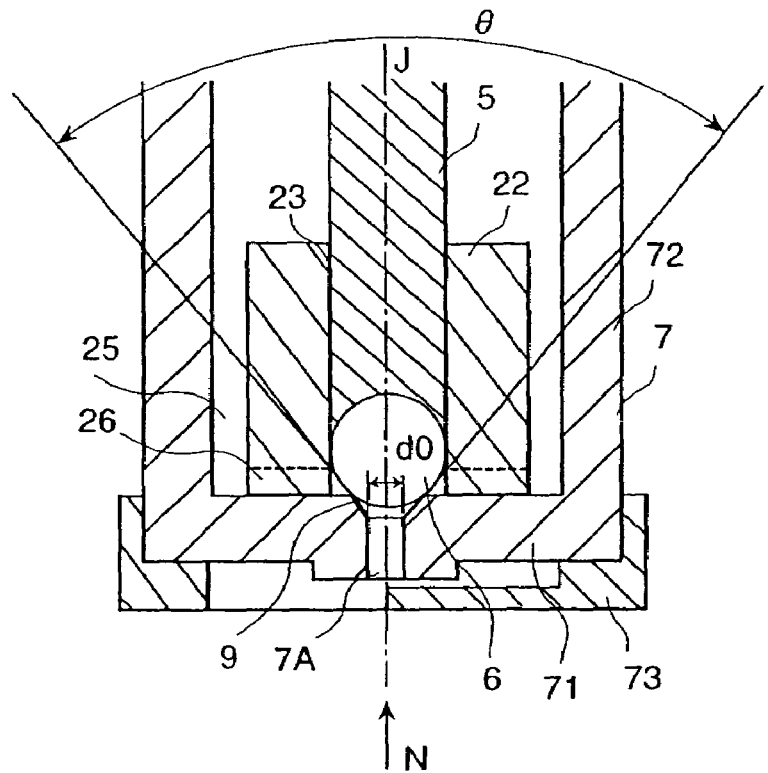
Figure 12B:
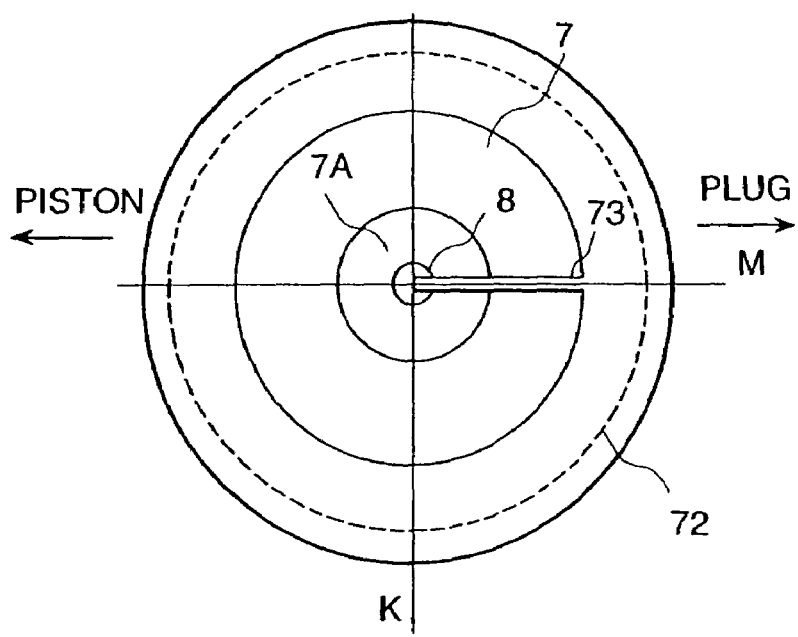

Now, a further embodiment of a fuel injection valve will be explained with reference to FIGS. 12A and 12B. In the nozzle member 7 as shown in FIGS. 12A and 12B, a member 73 which shields a part of the spray is provided at the outlet portion of the injection hole 8. Regardless of the configurations of the spray at the upstream side (upward portion from the member 73 in FIGS. 12A and 12B), a part of the spray can be forcedly cut by the member 73. Accordingly, it is expected that this will increase the nozzle design freedom. The member 73 need not necessarily be a separate body.

Figure 13:
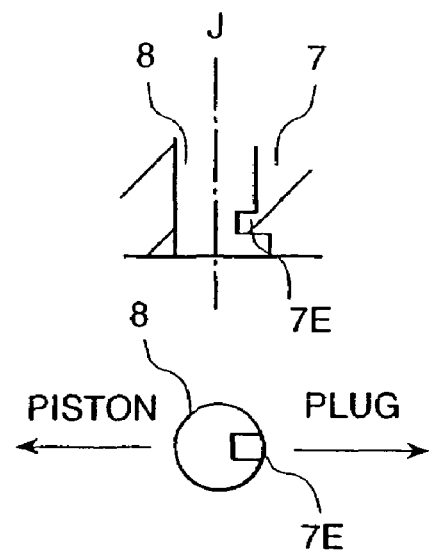
FIG. 13 is a sectional view of a further embodiment relating to the embodiment of FIGS. 9A, 9B and 9C and shows a top end portion of an injection hole and a plane view of the injection hole as seen from the side of the outlet port.

Further, as shown in FIG. 13, through provision of a projecting portion 7E in a part inside the injection hole 8, a part of the spray can be cut by shielding a part of the fuel. It is preferable to use plastic working, such as press working, for forming the projecting portion 7E.

Figure 14:
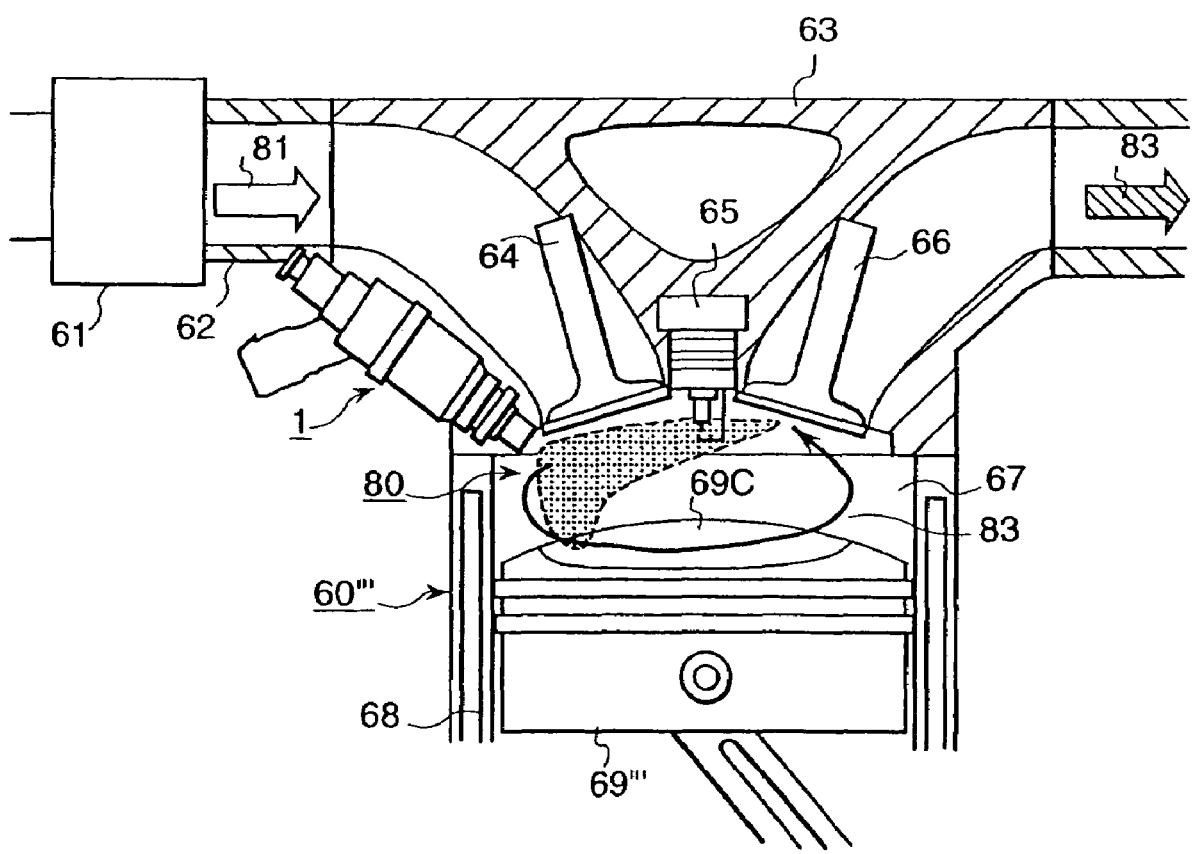
FIG. 14 is a vertical sectional view showing a further embodiment of an internal combustion engine according to the present invention.

A further embodiment of an internal combustion engine will be explained with reference to FIG. 14.

In an internal combustion engine 60''', a cavity 69C is provided for guiding a tumble flow 83 which rotates in an opposite direction as compared to the embodiment described in connection with FIGS. 9A through 9C. A difference between the present embodiment and the FIGS. 9A through 9C embodiment is that when the tumble flow 83 is guided and raised by the cavity 69C and is directed toward the ignition unit 65, since the tumble flow 83 opposes the air fuel mixture 80, a movement of the air fuel mixture 80 toward the exhaust valves 66 is suppressed, thereby, a fuel deposition on the wall face of the cylinder 68 can be suppressed. Further, since the tumble flow 83 passes between the air fuel mixture 80 and the cavity 69C, a fuel deposition to the piston side is also effectively suppressed.

Now, a further embodiment of a fuel injection valve according to the present invention will be explained with reference to FIGS. 15A and 15B.

Figure 15A:
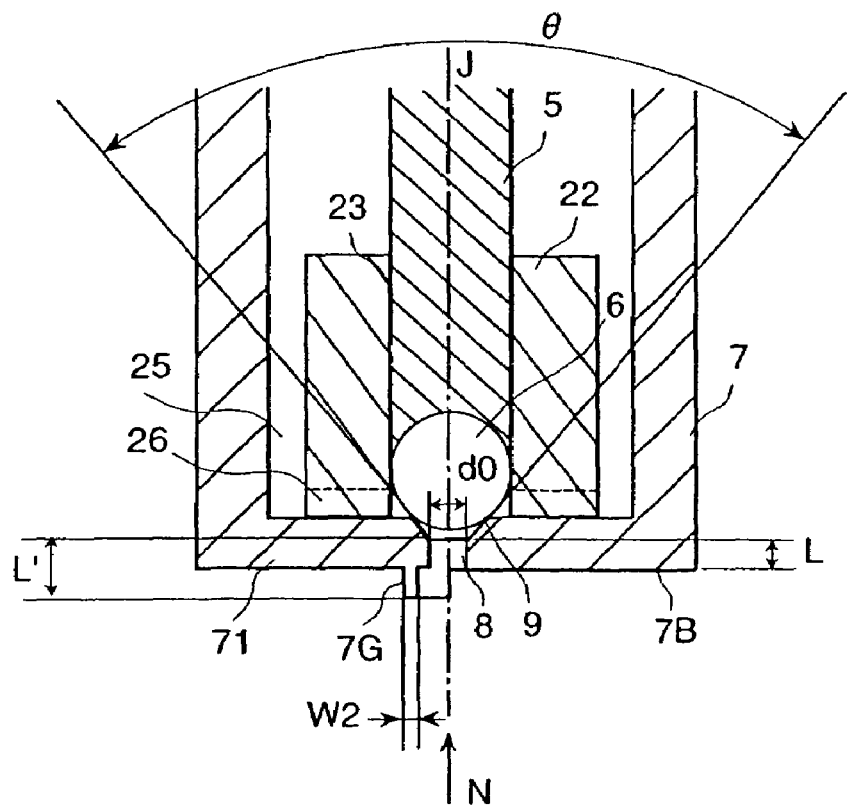
Figure 15B:
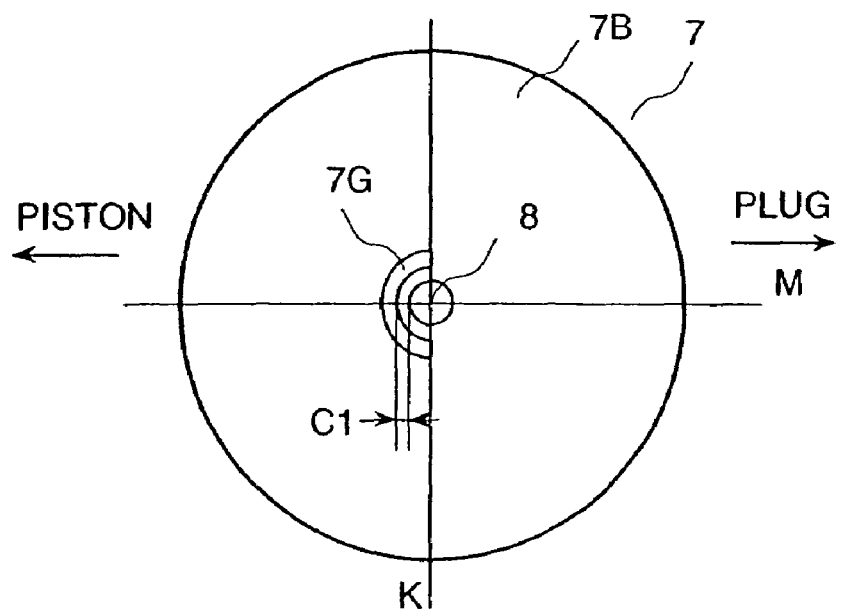

In the nozzle member 7 as shown in FIGS. 15A and 15B, a projection shape wall portion 7G which partially restricts an expansion of a spray is provided at the outlet portion of the injection hole 8. In the present embodiment, with the projection shape wall portion 7G having a width W2 and a height (L'–L) and provided at a distance C1 away from the periphery of the injection hole 8, a spray is deflected and a part of the spray is cut. The deflection amount of the spray (the angles α1 or β as shown in FIG. 3A) and the expansion Ws in lateral cross section of the spray (as shown in FIG. 3B) can be adjusted by the width W2 and the height (L'–L). It is preferable to form the projection shape wall portion 7G, for example, by plastic working such as pressing and cutting work. Further, the projection shape wall portion 7G need not necessarily be integrated with the nozzle member, but can be formed by welding or press fitting a separate member to the nozzle member 71. Further, in the present embodiment, since the periphery of the injection hole 8 is located away from the projection shape wall portion 7G, a finishing of the periphery portion of the injection hole 8, which is an important processing for a nozzle production, can be performed comparatively easy, thereby, the productivity thereof is improved.

According to the present invention, through removal of a part of the wall face forming the injection hole at the outlet portion thereof, the restriction of the spray flow is released at the side where the part of the wall portion is removed, thereby, the air fuel mixture converges in this released direction. Further, with regard to the spray in the opposite direction, the spray flow is restricted by the wall face forming the injection hole, thereby, the fuel particles in the mixture are lean, with the result that a deflection spray is formed which is hardly collapsed because the pressure difference between the inside and the outside of the spray is reduced.

Further, a spray is formed in an internal combustion engine in such a manner that the air fuel mixture is converged toward the ignition unit and the fuel particles in the mixture toward the piston are lean, thereby, the ignition property for the internal combustion engine is improved, and an exhaust amount of unburnt gas components is reduced.

What we claim is:
1. A fuel injection valve for injecting fuel,
wherein a fuel spray injected from the fuel injection valve
    includes a first portion having a long spray reaching
    distance and a second portion having a short spray
    reaching distance, wherein the first portion consists essentially of a fuel rich spray portion and the second portion consists essentially of a fuel lean spray portion, wherein the first portion having the long spray reaching distance and the second portion having the short spray reaching distance are formed around a circumference of a cross section crossing a central axis line of an injection hole in the fuel injection valve, wherein the fuel lean spray portion exists at only one location in the circumference of the cross section crossing the central axis line of the injection hole, and wherein a flow rate of fuel injected from the fuel injection valve will include only one peak along a first axis imaged on said cross section, which first axis passes through said fuel lean spray portion in an area where no peaks of the flow rate of fuel are located, such that the flow rate of fuel along the first axis in the area where it passes through the fuel lean spray portion is substantially the same as the flow rate of fuel in a central portion of the spray pattern along the central axis line, and, wherein the flow rate of fuel will include two peaks along a second axis which is imaged on said cross section and is perpendicular to said first axis.

2. A fuel injection valve according to claim 1, wherein said only one peak on the first axis is offset from said central axis line of the injection hole on said cross section.

3. A fuel injection valve according to claim 1, wherein said only one peak on the first axis is offset from said central axis line of the injection hole on said cross section and said two peaks on the second axis exist on both sides of said central axis line of the injection hole on said cross section respectively.

4. A fuel injection valve according to claim 1, wherein the fuel lean spray portion exists at an opposite side of the fuel rich spray portion with respect to a center of the cross section of the fuel spray.

5. A fuel injection valve according to claim 1, wherein a continuity in the circumference of the cross section in the fuel spray is substantially cut at the fuel lean spray portion.

6. A fuel injection valve according to claim 1, wherein the cross section of the fuel spray is horseshoe shape.

7. A fuel injection valve for injecting fuel, wherein a fuel spray injected from the fuel injection valve includes a first portion having a long spray reaching distance and a second portion having a short spray reaching distance, wherein the first portion consists essentially of a fuel rich spray portion and the second portion consists essentially of a fuel lean spray portion, wherein the first portion having the long spray reaching distance and the second portion having the short spray reaching distance are formed around a circumference of a cross section crossing a valve axial line of the fuel injection valve, wherein the fuel lean spray portion exists at only one location in the circumference of the cross section crossing the valve axial line of the injection valve, and wherein a flow rate of fuel injected from the fuel injection valve will include only one peak along a first axis imaged on said cross section, which first axis passes through said fuel lean spray portion in an area where no peaks of the flow rate of fuel are located, such that the flow rate of fuel along the first axis in the area where it passes through the fuel lean spray portion is substantially the same as the flow rate of fuel in a central portion of the spray pattern along a central axis line of the spray, and wherein said flow rate of fuel will include two peaks along a second axis which is imaged on said cross section and is perpendicular to said first axis.

8. A fuel injection valve according to claim 7, wherein said only one peak on the first axis is offset from said valve axial line of the injection valve on said cross section.

9. A fuel injection valve according to claim 7, wherein said only one peak on the first axis is offset from said valve axial line of the injection valve on said cross section and said two peaks on the second axis exist on both sides of said valve axial line of the injection valve on said cross section respectively.

10. A fuel injection valve according to claim 7, wherein the fuel lean spray portion exists at an opposite side of the fuel rich spray portion with respect to a center of the cross section of the fuel spray.

11. A fuel injection valve according to claim 7, wherein a continuity in the circumference of the cross section in the fuel spray is substantially cut at the fuel lean spray portion.

12. A fuel injection valve according to claim 7, wherein the cross section of the fuel spray is horseshoe shape.

* * * * *